(12) United States Patent
Nahrwold et al.

(10) Patent No.: US 9,885,415 B2
(45) Date of Patent: Feb. 6, 2018

(54) DIFFERENTIAL CLUTCH CARRIER LUBRICATION AND COOLING SYSTEM

(71) Applicant: Dana Automotive Systems Group, LLC, Maumee, OH (US)

(72) Inventors: Thomas L. Nahrwold, Napoleon, OH (US); Randy L. Sommer, Monroeville, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/192,190

(22) Filed: Jun. 24, 2016

(65) Prior Publication Data

US 2016/0377168 A1    Dec. 29, 2016

Related U.S. Application Data

(60) Provisional application No. 62/184,312, filed on Jun. 25, 2015.

(51) Int. Cl.
| | |
|---|---|
| *F16H 57/04* | (2010.01) |
| *F16H 48/22* | (2006.01) |
| *F16H 48/08* | (2006.01) |
| *F16H 57/037* | (2012.01) |

(52) U.S. Cl.
CPC ......... *F16H 57/0483* (2013.01); *F16H 48/08* (2013.01); *F16H 48/22* (2013.01); *F16H 57/037* (2013.01); *F16H 57/0424* (2013.01); *F16H 57/0457* (2013.01); *F16H 57/0471* (2013.01); *F16H 57/0473* (2013.01)

(58) Field of Classification Search
None
See application file for complete search history.

(56) References Cited

U.S. PATENT DOCUMENTS

| | | | |
|---|---|---|---|
| 3,741,343 A | | 6/1973 | Lindenfeld et al. |
| 3,762,503 A | | 10/1973 | Wilder et al. |
| 5,366,421 A | * | 11/1994 | Hirota .................. B60K 17/20 475/231 |
| 5,520,589 A | | 5/1996 | Dewald et al. |
| 5,535,850 A | | 7/1996 | Tar et al. |

(Continued)

FOREIGN PATENT DOCUMENTS

| | | |
|---|---|---|
| EP | 2574826 A1 | 4/2013 |
| EP | 2574827 A1 | 4/2013 |

*Primary Examiner* — Edwin A Young
(74) *Attorney, Agent, or Firm* — Marshall & Melhorn, LLC

(57) ABSTRACT

An axle assembly for a vehicle including a differential carrier having a first portion and a second portion. The first portion including a first engagement surface coupled with a second engagement surface of the second portion. The differential carrier defines a differential area and a clutch area substantially separated by a partition. The differential carrier first engagement surface defines a lubricant channel fluidly connecting the differential area with the clutch area, and at least partially located above the clutch area and at least partially located in an outer wall of the differential carrier. The axle assembly further includes a bearing retainer disposed through the outer wall of the differential carrier. The bearing retainer includes an aperture therethrough, fluidly connecting the lubricant channel with a clutch assembly.

14 Claims, 7 Drawing Sheets

(56) References Cited

U.S. PATENT DOCUMENTS

| | | | |
|---|---|---|---|
| 5,536,215 A * | 7/1996 | Shaffer | B60K 17/20 |
| | | | 475/88 |
| 7,094,172 B2 | 8/2006 | Ishikawa | |
| 7,625,308 B2 | 12/2009 | Okazaki | |
| 7,954,612 B2 | 6/2011 | Mogami et al. | |
| 8,382,628 B2 | 2/2013 | Hilker et al. | |
| 8,475,314 B2 | 7/2013 | Corless et al. | |
| 8,684,876 B2 | 4/2014 | Corless et al. | |
| 8,845,473 B2 | 9/2014 | Nett et al. | |
| 8,961,348 B2 | 2/2015 | Weber et al. | |
| 2009/0093333 A1* | 4/2009 | Adams, III | F16H 48/08 |
| | | | 475/88 |
| 2010/0304914 A1 | 12/2010 | Barrett et al. | |
| 2011/0281680 A1 | 11/2011 | Forssberg | |
| 2014/0231209 A1 | 8/2014 | Nett et al. | |
| 2014/0231211 A1 | 8/2014 | Nett et al. | |
| 2015/0057123 A1 | 2/2015 | Phelps et al. | |
| 2015/0057125 A1 | 2/2015 | Pump et al. | |
| 2015/0192198 A1 | 7/2015 | Suzuki | |

\* cited by examiner

DIFFERENTIAL CLUTCH CARRIER LUBRICATION AND COOLING SYSTEM

RELATED APPLICATIONS

The present application claims the benefit to U.S. Provisional Application No. 62/184,312 filed on Jun. 25, 2015, which is incorporated herein by reference in its entirety.

BACKGROUND OF THE DISCLOSURE

The present subject matter relates to a driving force distribution apparatus. A driving force distribution apparatus may include a differential assembly and a clutch assembly to transmit drive force. The driving force distribution apparatus may further include a lubrication system. The lubrication system may provide lubrication and cooling of the clutch assembly. Conventional driving force distribution apparatus create concern for the effectiveness of the clutch assembly lubrication and the system drag torque.

In view of the above, there remains a need for a driving force distribution apparatus having increased system efficiency.

SUMMARY

An axle assembly for a vehicle including a differential carrier having a first portion and a second portion. The first portion including a first engagement surface coupled with a second engagement surface of the second portion. The differential carrier defines a differential area and a clutch area substantially separated by a partition. The differential carrier first engagement surface defines a lubricant channel fluidly connecting the differential area with the clutch area. The lubricant channel is at least partially located above the clutch area and at least partially located in an outer wall of the differential carrier. The axle assembly further includes a bearing retainer disposed through the outer wall of the differential carrier. The bearing retainer includes an aperture therethrough, fluidly connecting the lubricant channel with a clutch assembly.

The axle assembly may also include a first lubricant circulating device in the differential area, and/or a second lubricant circulating device in the clutch area.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

DETAILED DESCRIPTION OF THE DISCLOSURE

Figure 1:
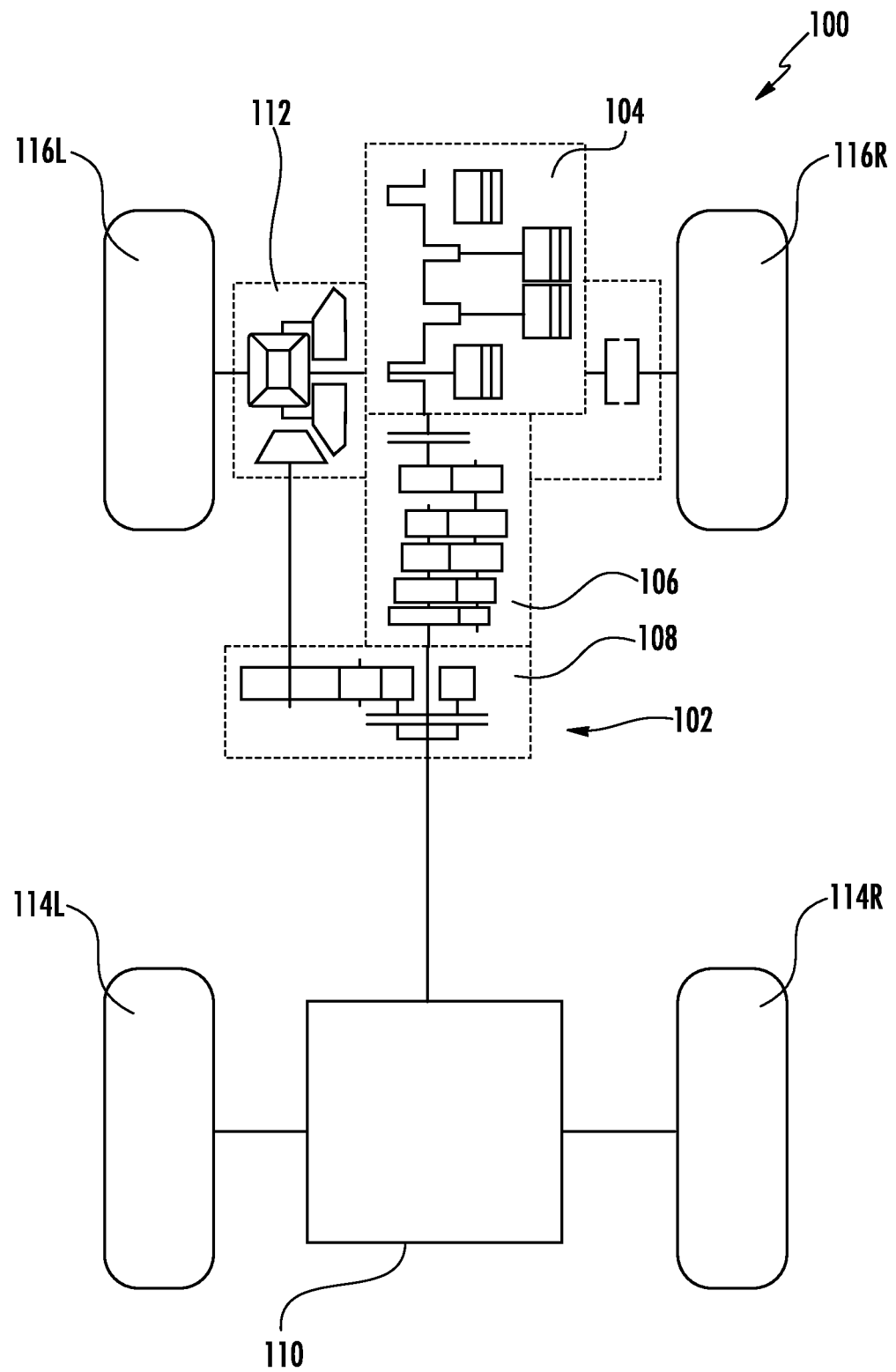
FIG. 1 is a schematic diagram of a portion of a powertrain according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

As illustrated in FIG. 1, a vehicle having a first axle assembly constructed in accordance with the teachings of the present disclosure is generally indicated by reference numeral 100. The vehicle 100 may comprise a powertrain 102 having all-wheel drive functionality. The powertrain 102 may include a power source 104 having an output driveably connected with a transmission 106 input. The power source 104 may be, but is not limited to, an internal combustion engine or an electric motor. In one embodiment, as illustrated in FIG. 1, the powertrain 102 may include a transfer case 108 driveably connected to an output of the transmission 106, a first axle assembly 110, and a second axle assembly 112. The first axle assembly 110 is driveably connected with the transmission 106 and continuously transmits torque from an engine 104 to a pair of rear wheels 114L, 114R. The second axle assembly 112 selectively transmits engine 104 torque to a pair of front wheels 116L, 116R via the transfer case 108. The front axle assembly 110 includes a differential clutch carrier 120.

Figure 2:
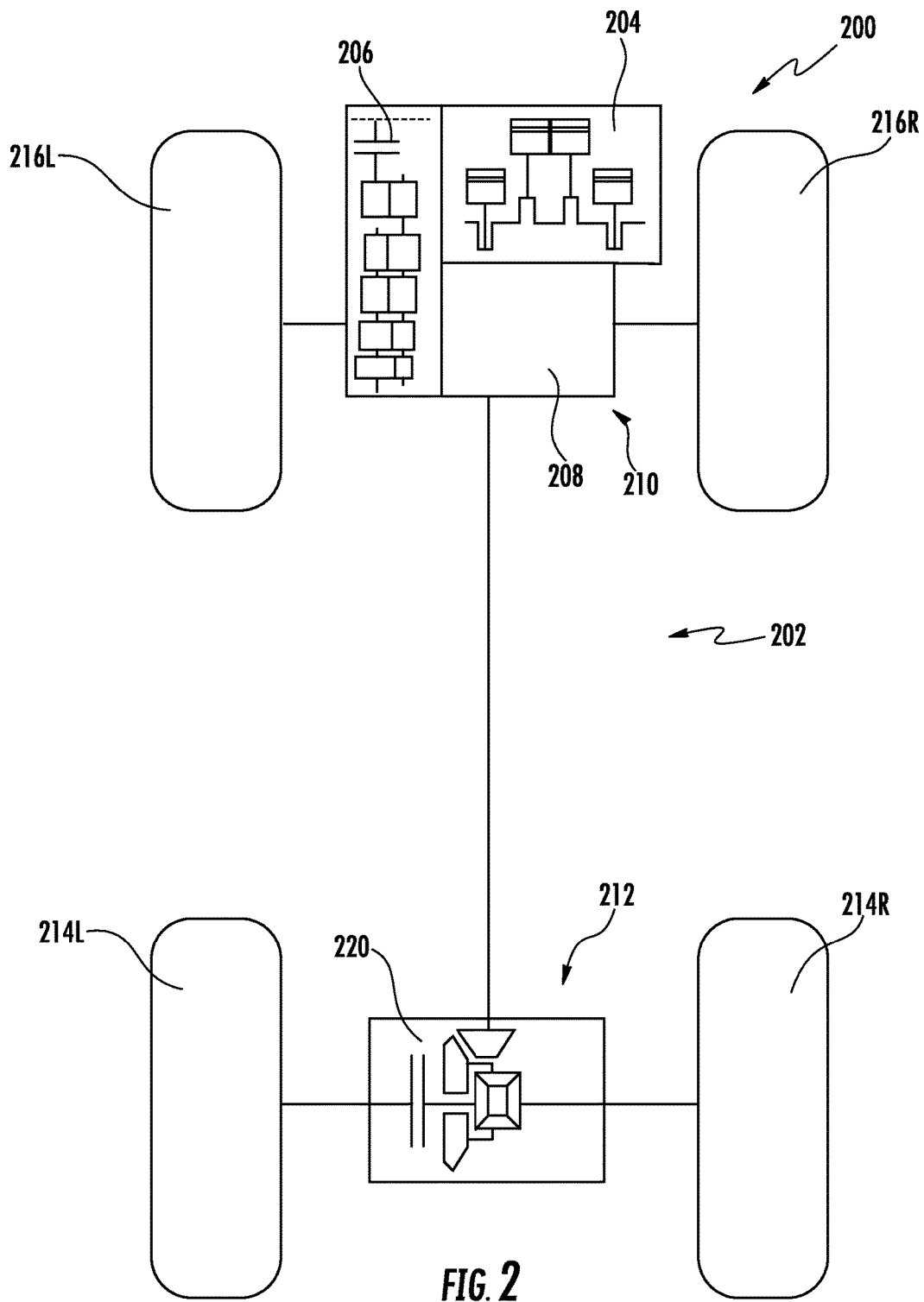
FIG. 2 is another schematic diagram of a portion of a powertrain according to an embodiment of the presently disclosed subject matter.

As illustrated in FIG. 2, a vehicle having a first axle assembly constructed in accordance with the teachings of the present disclosure is generally indicated by reference numeral 200. The vehicle 200 may comprise a powertrain 202 having all-wheel drive functionality. The powertrain 202 may include a power source 204 having an output driveably connected with a transmission 206 input. The power source 204 may be, but is not limited to, an internal combustion engine or an electric motor. The powertrain 202 may include a first axle assembly 210. In one embodiment, as illustrated in FIG. 2, the first axle assembly 210 comprises a power transfer unit 208 driveably connected with an output of the transmission 206. The powertrain 202 may also include a second axle assembly 212. The first axle assembly 210 is driveably connected with the transmission 206 and continuously transmits power source 204 torque to a pair of front wheels 216L, 216R. The second axle assembly 212 selectively transmits power source 204 torque to a pair of rear wheels 214L, 214R via the power transfer unit 208. The second axle assembly 212 includes a differential clutch carrier 220.

Figure 3:
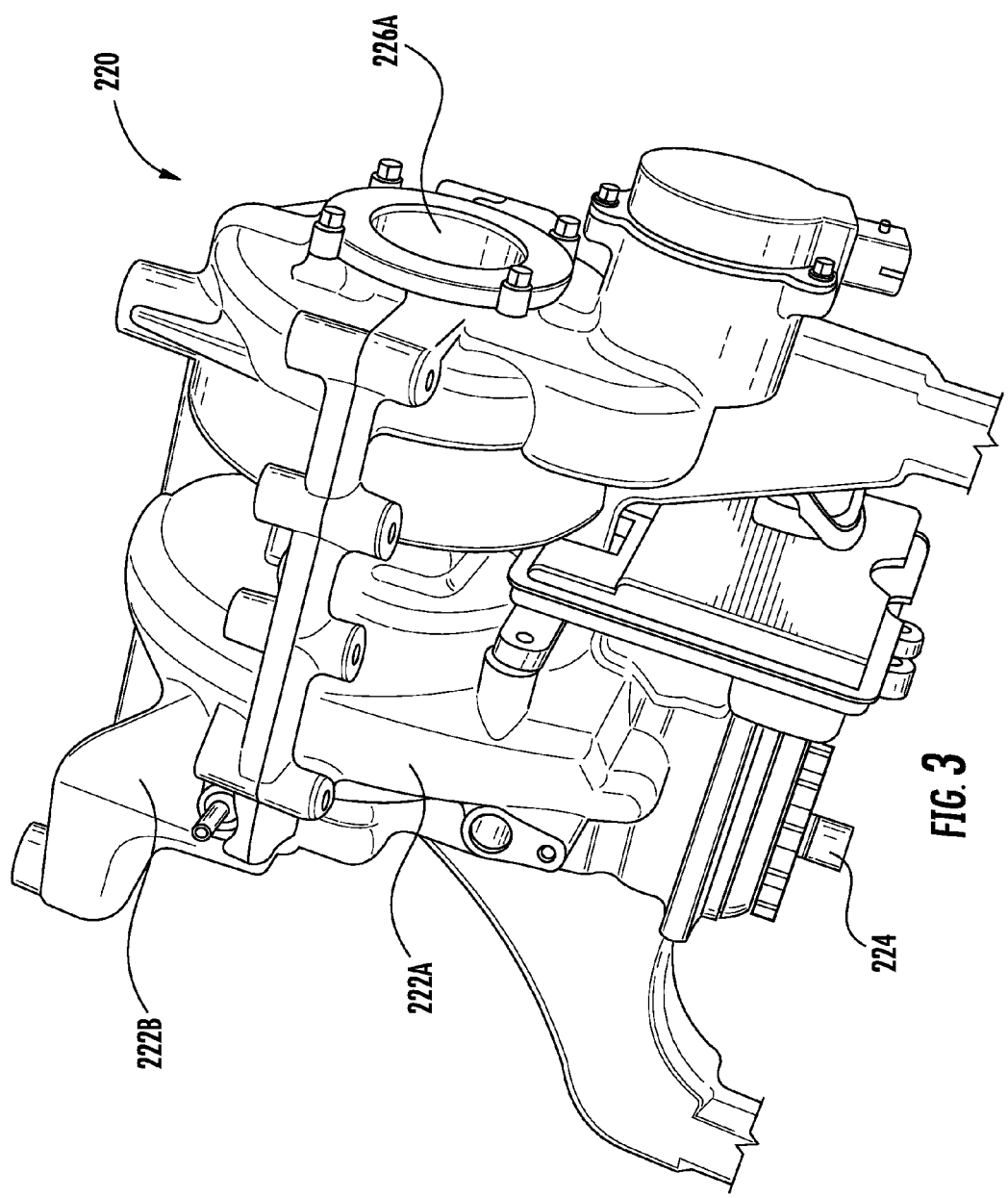
FIG. 3 is a perspective view of a portion of the driveline of FIG. 2.

Turning to FIG. 3, one embodiment of the differential clutch carrier 220 is depicted. However, the invention is not limited to the carrier as shown in FIG. 3. Instead, the present subject matter may be utilized with carriers of other shapes, sizes, orientations and designs.

Figure 4:
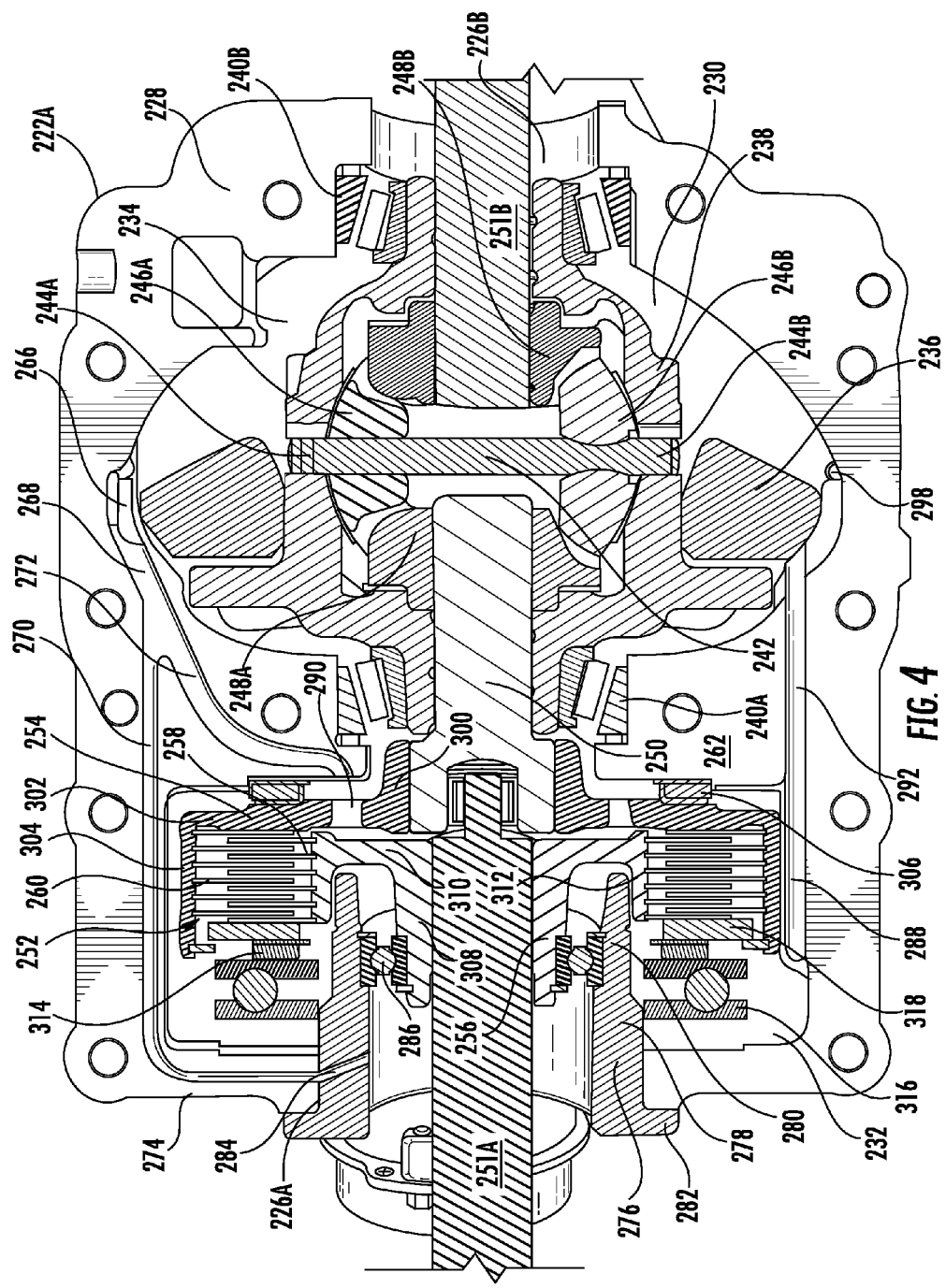
FIG. 4 is a cross-sectional view of a portion of the driveline of FIG. 3.

As illustrated in FIGS. 3 and 4, the differential clutch carrier 220 comprises a two piece differential carrier, the first carrier portion 222A and the second carrier portion 222B. The first carrier portion 222A has an engagement surface 228 and the second carrier portion 222B includes a complimentary engagement surface (not depicted). The first and second carrier portions 222A, 222B are coupled together at their complementary surfaces via mechanical fasteners (not depicted).

The first axle assembly 210 includes a pinion shaft 224 and a pinion gear (not depicted) for receiving rotation from the power source 204. The first axle assembly 210 differential clutch carrier 220 comprises two opposed openings through which axle half shafts 251A, 251B extend; a first opening 226A and a second opening 226B. The axle half shaft 251A extends through the first opening 226A, and the axle half shaft 251B extends through the second opening 226B. The opposed openings 226A, 226B are oriented transverse to the pinion shaft 224. The axle half shafts 251A, 251B connect to wheel ends (not depicted) coupled with the rear wheels 214L, 214R.

FIG. 4 depicts a portion of a section view through the first axle assembly 210 of FIG. 3 at the engagement surface 228. As illustrated in FIG. 4, the interior of the differential clutch carrier 220 is divided into two areas: a differential area 230 and a clutch area 232. The differential area 230 and the clutch area 232 are defined by the first and second carrier portion 222A, 222B (as seen in FIG. 3) and a partition 262. therein between the differential area 230 and the clutch area 232.

As illustrated in FIG. 4, in an embodiment, the partition 262 is formed unitary with the first and second carrier portion 222A, 222B. The partition 262 divides the differential area 230 and the clutch area 232. However, an opening 264 extends from the differential area 230 to the clutch area 232 through the partition 262.

The differential area 230 houses a differential assembly 234. The differential assembly 234 comprises a ring gear 236 in meshing engagement with the pinion gear. The ring gear 236 is coupled with a differential case 238, such as through mechanical fasteners and/or welding.

The differential case 238 is mounted for rotation within the differential clutch carrier 220 with a pair of bearings 240A, 240B. The bearings 240A, 240B are disposed about a trunnion, or cylindrical protrusion, on opposing portions of the differential case 238 for support thereof inside the differential clutch carrier housing 220. The pinion gear rotates the ring gear 236 and through the connection of the ring gear 236 to the differential case 238, the differential case 238 rotates with the ring gear 236.

The bearing 240A is disposed in a first diameter portion of the partition 262 opening 264. The bearing 240B is disposed in a first diameter portion of the differential clutch carrier 220 second opening 226B.

The differential case 238 has a hollow interior. A spider shaft 242 extends through the hollow interior of the differential case 238 and is coupled at a first end 244A and a second end 244B with the differential case 238. A first pinion gear 246A is mounted on the spider shaft first end 244A and a second pinion gear 246B is mounted on the spider shaft second end 244B. The pinion gears 246A, 246B are meshed with a first side gear 248A and a second side gear 248B within the differential case 238. The second side gear 248B is splined to the axle half shaft 251B and the first side gear 248A is splined to a stub shaft 250. The stub shaft 250 extends from the differential area 230 to the clutch area 232 through the opening 264 in the partition 262.

In another embodiment, not depicted, the differential assembly 234 may comprise four pinion gears in meshing engagement with a pair of side gears. The pinion gears may be mounted on a unitary cross type pin, a spider shaft and two additional pins, or four independent pins; the end of the pins and/or spidershaft may be coupled with a differential case, or may be coupled with a canister insert housed inside the differential case.

As illustrated in FIG. 4, a wet-type clutch assembly 252 is located within the clutch area 232. The clutch assembly 252 comprises a drum portion 254 driveably enmeshed with splines on an outboard end of the stub shaft 250 for rotation therewith. The drum portion 254 comprises an axially extending center portion 300. The center portion 300 includes a cylindrical interior surface having splines meshed with the splines of the outboard end of the stub shaft 250. The drum portion 254 further comprises a radially extending circular wall portion 302. The wall portion 302 is coupled with, and may be unitary with, the center portion 300. A plurality of apertures 290 extend axially through the drum portion 254 wall portion 300, substantially parallel with the axis of rotation of the stub shaft 250. In an embodiment, four apertures 290 are disposed in the wall portion 300. The drum portion 254 additionally comprises an axially extending cylindrical portion 304. The cylindrical portion 304 is coupled with, and may be unitary with, the wall portion 302. A plurality of axially extending splines are formed on an internal surface of the cylindrical portion 304.

A portion of the drum portion 254 center portion 300 is located within a second diameter portion of the partition 262 opening 264. The second diameter portion of the partition 262 opening 264 has a smaller diameter than the first diameter portion of the opening 264.

The clutch assembly 252 also comprises a hub portion 256 substantially concentric with the drum portion 254. The hub portion 256 comprises an axially extending substantially cylindrical center portion 308 having a splined internal surface that is meshed with the spline on the axle half shaft 251A coupled with the wheel 114L. The hub portion 256 also comprises a radially extending wall portion 310 coupled with the inboard end of the center portion 308. In certain embodiments, the wall portion 310 may be formed unitary with the center portion 308. An axially extending cylindrical portion 312 is coupled at its inboard end with the outer edge of the wall portion 310. In an embodiment, the cylindrical portion 312 may be formed unitary with the wall portion 310. An outer surface of the cylindrical portion 312 comprises a plurality of axially extending splines.

The hub portion 256 cylindrical portion 312 is concentric with the wall portion 310 and the center portion 308. As illustrated in FIG. 4, in an embodiment, the hub portion 256 center portion 308, wall portion 310, and cylindrical portion 312 are located concentric with and inside the drum portion 254 cylindrical portion 304.

The hub portion 256 cylindrical portion 312 has a first set of plates 258 coupled therewith for selective axial movement along the hub portion 256. The first set of plates 258 may include a plurality of splines or teeth on an internal circumference, or internal surface, thereof for engagement with the splines on the cylindrical portion 312. The first set of plates 258 extend radially outward from the hub portion 256.

The drum portion 254 comprises a second set of plates 260 coupled therewith for selective axial movement along the drum portion 254. The second set of plates 260 may include a plurality of splines or teeth on a rim, or external surface, thereof for engagement with the splines on the cylindrical portion 304. The second set of plates 260 extends radially inward from the drum portion 254 cylindrical portion 304. The individual plates from the second set of plates 260 are interleaved with the individual plates from the first set of plates 258. The first and second set of plates 258, 260 comprise a clutch pack.

The first set of plates 258 can be selectively frictionally engaged, and locked, with the second set of plates 260 when the plates are compressed together. The axial compression required to compress the plates together can be made through, for example, a ball and ramp actuator, a fluid driven piston, an electromagnetic structure, a mechanical structure, or other linear-type actuator indicated in FIG. 4 by reference numeral 316. The linear-type actuator 316 acts upon a pressure plate 318 in an axial direction. The pressure plate 318 is moved in an axial direction by the linear-type actuator 316 to frictionally engage the clutch pack.

When frictionally engaged, the first and second set of plates 258, 260 prevent relative rotation between them, thus locking the axle half shaft 251A coupled with the wheel 114L for rotation with the differential side gear 248A. When the axial compression of the first and second set of clutch plates 258, 260 is relaxed, the first and second set of plates 258, 260 separate, thus disconnecting the axle half shaft 251A from the stub shaft 250.

A first annular thrust bearing 306 is disposed between the clutch assembly 252 drum portion 254 wall portion 304 and the partition 262. A second annular thrust bearing 314 is located between the pressure plate 318 and the linear-type actuator 316. The thrust bearings 306, 316 assist in enabling rotation of the drum portion 254, and the pressure plate 318, when the clutch pack is engaged. The first annular thrust bearing 306 is substantially annular in geometry and is located radially outside the plurality of apertures 290.

The above-described frictional engagement of the clutch assembly 252 generates an appreciable amount of heat. It has been found that the clutch assembly 252 cannot function at the desired efficiency while experiencing elevated temperatures, and/or the heat can cause the clutch assembly 252 to prematurely fail.

Cooling lubricant may therefore be circulated from the differential area 230 to the clutch area 232 to cool the clutch assembly 252. As illustrated in FIG. 4, in an embodiment, a first lubricant catch 266 may be located in the differential clutch carrier 220 first carrier portion engagement surface 228. The first lubricant catch 266 may also be defined by a portion of an interior wall of the first carrier portion 222A. More particularly, the first lubricant catch 266 may be cast into the differential clutch carrier 220 first carrier portion 222A engagement surface 228 and interior wall so that expensive post-casting machining is not required. In an embodiment, the second carrier portion 222B may also define a portion of the first lubricant catch 266.

In the depicted embodiment, the first lubricant catch 266 is located at an upper portion of the differential area 230. Particularly, the first lubricant catch 266 is substantially disposed adjacent to the outer circumference of the ring gear 236. The first lubricant catch 266 defines an inlet to a lubricant channel 268. The first lubricant catch 266 includes a portion outletting to the lubricant channel 268 and may extend downwardly from the upper portion of the differential area 230. The first lubricant catch 266 may comprise an opening of a predetermined shape and size such as, but not limited to, a cotyloid, a longitudinal section of a funnel, a segment of a sphere or spheroid, or a substantially rectilinear body.

The first lubricant catch 266 receives lubricant splashed or flung by the ring gear 236. The lubricant travels into the first lubricant catch 266, and from the first lubricant catch 266 into the lubricant channel 268. In the depicted embodiment, the lubricant channel 268 divides into a first lubricant channel 270 and a second lubricant channel 272.

The first and second lubricant channels 270, 272 are disposed in the differential clutch carrier 220 first engagement surface 228 extending from the differential area 230 to the clutch area 232. The first and second lubricant channels 270, 272 extend through the partition 262 permitting unidirectional fluid communication between the differential area 230 and the clutch area 232. The lubricant channel 268 and the lubricant channels 270, 272 are disposed in the first engagement surface 228 of the differential clutch carrier 220 such that they are defined by a groove in the first engagement surface 222A and the second engagement surface of the second carrier portion 222B. The lubricant channel 268 and the lubricant channels 270, 272 are disposed in the first engagement surface 228 of the differential clutch carrier 220 such that they may be cast into the differential clutch carrier 220, obviating expensive secondary machining operations to create them. In an embodiment, the lubricant channel 268 and the first and second lubricant channels 270, 272 may also be defined by a complimentary groove in the second engagement surface of the second carrier portion 222B.

In an embodiment (not depicted), the differential clutch carrier 220 may comprise only the first lubricant channel 270. In another embodiment (not depicted), the differential clutch carrier 220 may comprise only the second lubricant channel 272.

The first lubricant channel 270 extends off of the lubricant channel 268 substantially parallel to the axis of rotation of the differential assembly 234 and the axle half shafts 251A, 251B. The first lubricant channel 270 is located at least partially above the clutch area 232 and turns radially inward toward the axis of rotation in an outer wall 274 of the differential clutch carrier 220.

A substantially cylindrical bearing retainer 276 is disposed through the outer wall 274 of the differential clutch carrier 220 into the clutch area 232. The bearing retainer 276 comprises an annular body 278 having an extended portion 280. The extended portion 280 at least partially surrounds the clutch assembly 252 hub portion 256. Opposite the extended portion 280, the bearing retainer 276 comprises an annular shoulder 282. The annular shoulder 282 is engaged with an outside surface of the differential clutch carrier 220 outer wall 274 to position the bearing retainer 276. The bearing retainer 276 further comprises an aperture 284 through the annular body 278. A bearing 286 is located at the interior of the bearing retainer 276 extended portion 280 and coupled therewith. The bearing 286 is also disposed about and coupled with the clutch assembly 252 hub portion 256, allowing rotation of the hub portion 256.

The aperture 284 receives lubricant from the first lubricant channel 270. The lubricant may then pass through the bearing 286, placing the first lubricant channel 270 in fluid communication with the clutch assembly 252 hub portion 256. Once through the bearing 286, the lubricant flows radially outward through the first set of plates 258 of the hub portion 256. The rotation of the hub portion 256 forces the lubricant radially outward as a result of centrifugal force. The lubricant flows through the first set of clutch plates 258 and the second set of clutch plates 260, where the lubricant absorbs heat from the plates 258, 260, thereby cooling them. The lubricant flowing through the clutch plates 258, 260 then collects in a clutch area 232 lubricant sump 288.

The second lubricant channel 272 extends off of the lubricant channel 268 in a downward diagonal direction toward the axis of rotation of the differential assembly 234 and the axle half shafts 251A, 251B. As illustrated in FIG. 4, the second lubricant channel 272 extends in the first engagement surface 228 of the differential clutch carrier 220 partition 262 separating the differential area 230 from the clutch area 232. The second lubricant channel 272 is in fluid communication with the clutch assembly 252 via the plurality of apertures 290, in the drum portion 254 wall portion 300 of the clutch assembly 252. Lubricant passes through the second lubricant channel 272, through the drum portion 254 to the hub portion 256. The lubricant then communicates with the clutch plates 258, 260 as described above.

Lubricant may be delivered to the clutch assembly 252 with one or both of the above-described first and second lubricant channels 270, 272. While two lubricant channels have been described and depicted, one may be eliminated if desired.

Figure 5:
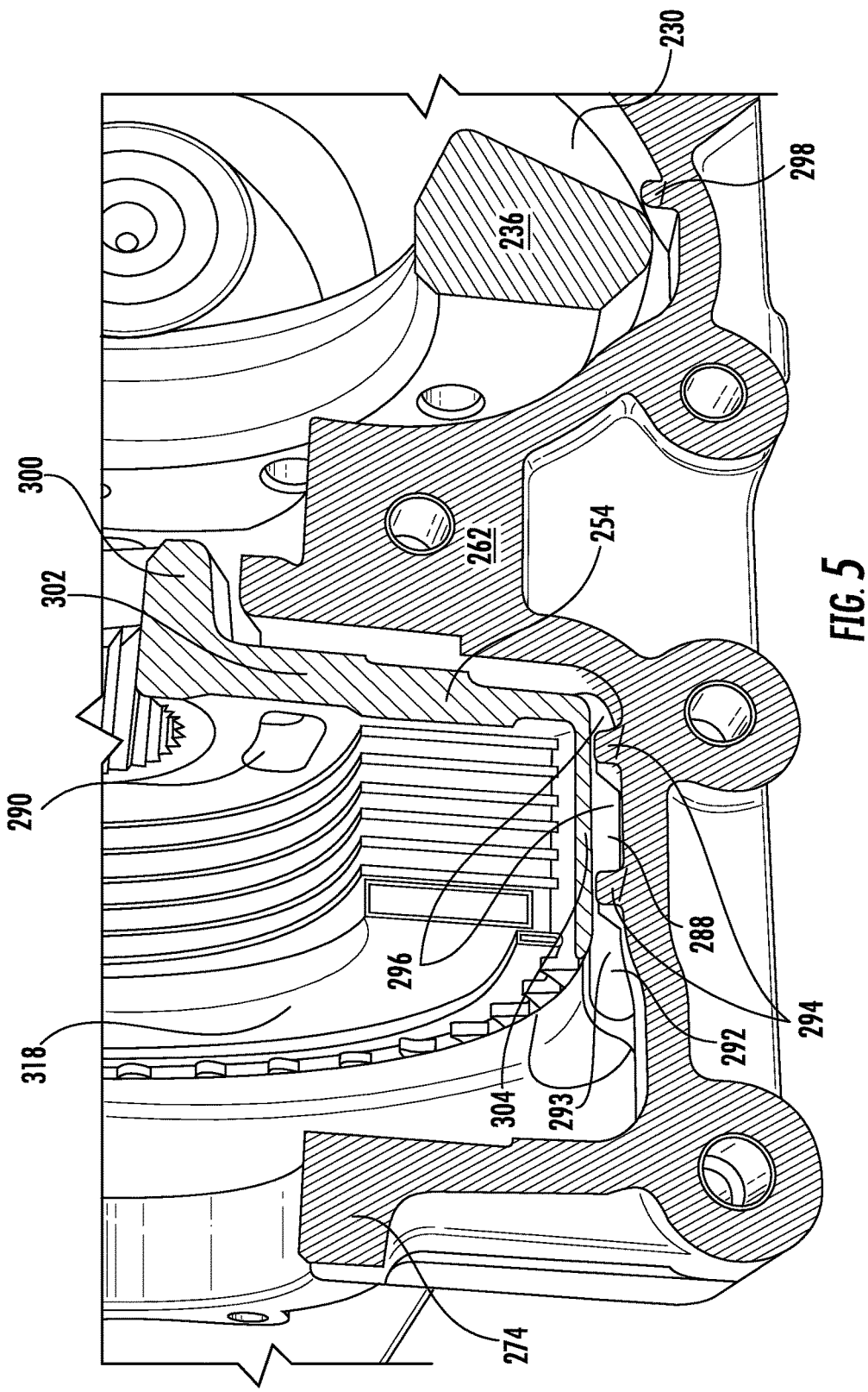
FIG. 5 is another cross-sectional view of a portion of the driveline of FIG. 3.

As shown in FIGS. 4 and 5, the clutch area 232 lubricant sump 288, located at the bottom of the clutch area 232, comprises a return channel 292 that is cast into the differential clutch carrier 220 first carrier portion 222A. The return channel 292 may be such as an axially extending groove, parallel to the axis of rotation of the differential assembly 234, in fluid communication with the clutch assembly 252. The return channel 292 may extend the axial length of the clutch assembly 252 in the clutch area 232 lubricant sump 288 to capture lubricant from the clutch assembly 252. In the depicted embodiment, a second lubricant catch 293 is formed unitary with a portion of the return channel 292. The second lubricant catch 293 is disposed substantially tangential with the exterior surface of the clutch assembly 252 drum portion 254 cylindrical portion 256. In an embodiment, the second lubricant catch 293 may comprise a geometry substantially similar to a hollow right circular cylinder positioned such that the hollow portion of the lubricant catch 293 faces the same direction as the first engagement surface 228. In another embodiment, the second lubricant catch 293 may comprise a groove in the first engagement surface 228. In certain embodiments, the second lubricant catch 293 functions to scrape lubricate from the exterior surface of the clutch assembly 252 drum portion 254 cylindrical portion 256. In other embodiments, the second lubricant catch 293 functions to catch, or collect, lubricant moved or flung by the exterior surface of the clutch assembly 252 drum portion 254 cylindrical portion 256.

In an embodiment, not depicted, the return channel 292 may include a third lubricant catch disposed opposite the second lubricant catch 293 in the clutch area 232 lubricant sump 288. The third lubricant catch may substantially mirror the second lubricant catch 293, and include a conduit in fluid communication with the return channel 292.

The lubricant sump 288 may also comprise radially extending protrusions 294 disposed upwardly along the differential clutch carrier 220 interior wall. The protrusions 294 may follow the slope of the differential clutch carrier 220 wall as it extends upwardly from the bottom of the clutch area 232. The protrusions 294 define one or more reservoirs 296 located within the lubricant sump 288. The reservoirs 296 may be axially spaced apart from one another. The protrusion 294 and the reservoirs 296 contribute to control of the lubricant and function to reduce the extreme axial movement of the lubricant in the lubricant sump 288.

The lubricant sump 288, the second lubricant catch 293, the reservoirs 296, and the drum portion 254 of the clutch assembly 252 comprise a lubricant circulating device, or pump mechanism, which delivers lubricant to the differential area 230. The lubricant circulating device generates a pumping action when the clutch assembly 252 is not engaged and the drum portion 254 rotates in the opposite direction of the rotating axle half shaft 251A. The friction created by the exterior surface of the drum portion 254 rotating through the lubricant in the clutch area 232 lubricant sump 288 serves to move the lubricant into the return channel 292. The lubricant circulating device also actively moves lubricant into the second lubricant catch 293 and the return channel 292 when the clutch assembly 252 is engaged and the drum portion 254 rotates in the direction of the rotating axle half shaft 251A.

In an embodiment having the third lubricant catch, when the clutch assembly 252 is engaged and the drum portion 254 rotates in the direction of the rotating axle half shaft 251A, the third lubricant catch primarily collects lubricant and delivers the lubricant to the return channel 292. Regardless of the direction of the rotation, the rotating clutch assembly 252 drum portion 254 moves the lubricant from the lubricant sump 288 through the return channel 292.

Figure 6:
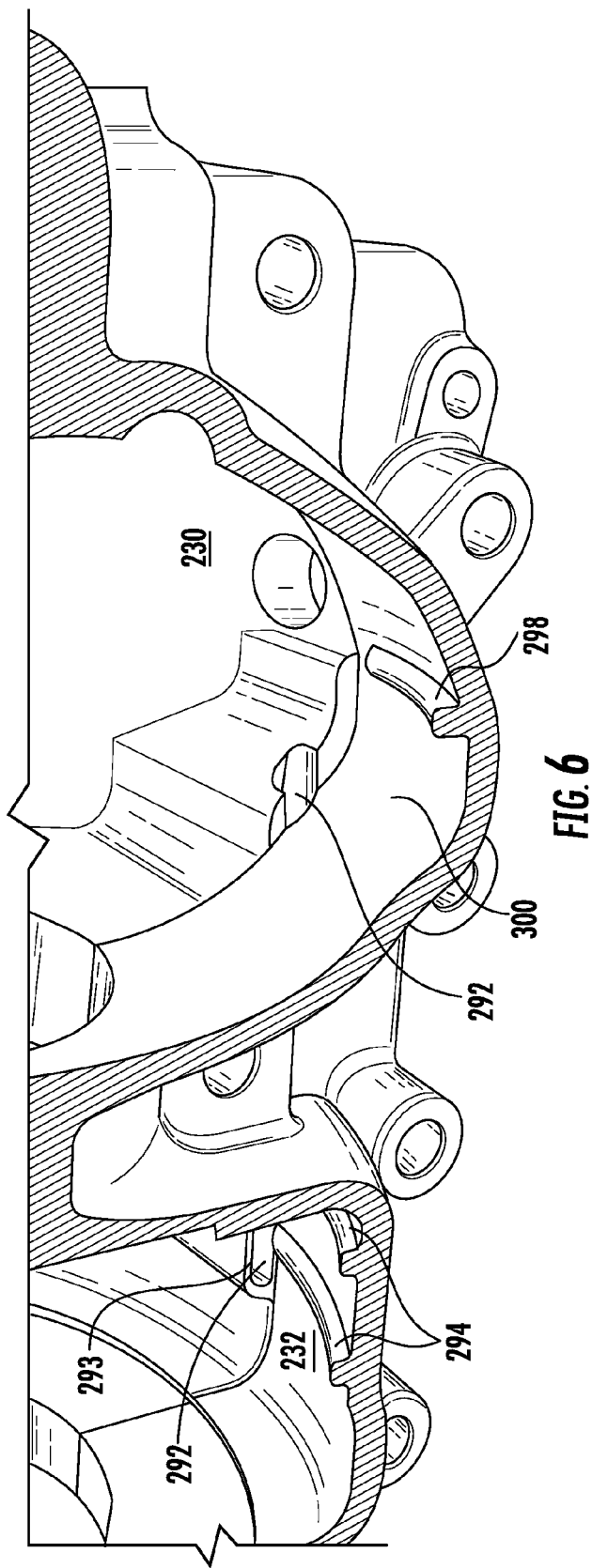
FIG. 6 is another cross-sectional view of a portion of the driveline of FIG. 3.
Figure 7:
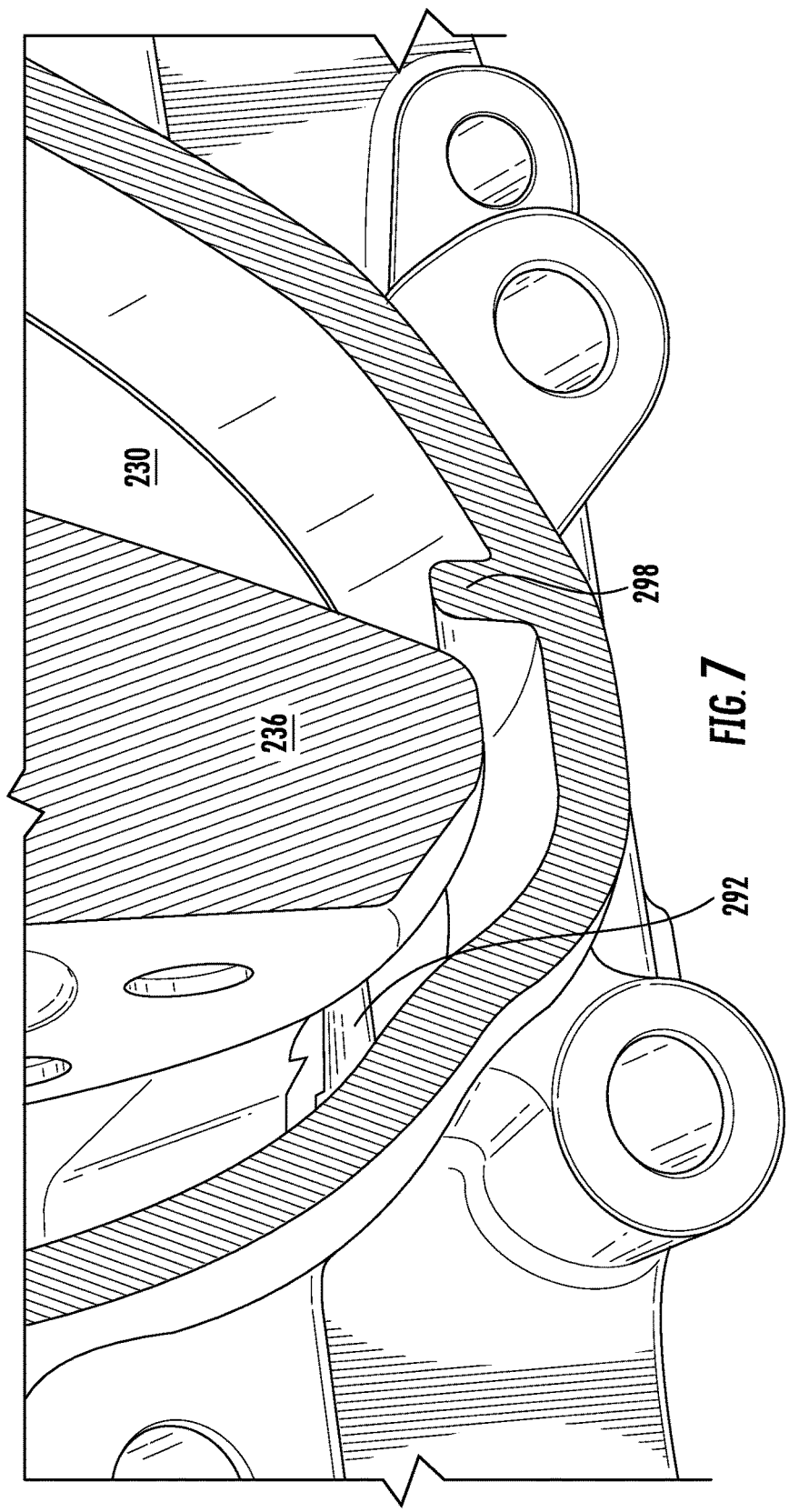
FIG. 7 is yet another cross-sectional view of a portion of the driveline of FIG. 3.

The lubricant is moved through the return channel 292 which connects the lubricant sump 288 to the differential area 230 lubricant sump. The return channel 292 is parallel with the rotational axis of the differential assembly 234 and is located through the differential clutch carrier 220 partition 262 below the stub shaft. The return channel 292 is cast into the first carrier portion 222A engagement surface 228, thus eliminating the need for a further machining step. The return channel 292 is best seen in FIGS. 4-6.

The return channel 292 opens into the differential area 230 adjacent the ring gear 236. A radially inward extending rib 298 is located adjacent the ring gear 236. See FIGS. 4 and 6. More particularly, the rib 298 is located in the bottom portion of the differential area 230 lubricant sump, and extends along the interior wall of the differential area 230. The rib 298 may be formed in both the first and second carrier portions 222A, 222B. Being so located near the ring gear 236, as the ring gear 236 rotates past the rib 298 a low pressure area 300 is created between the return channel 292 and the rib 298. The low pressure assists in drawing the lubricant from the clutch area 232, through the return channel 292, and into the differential area 230. The rib 298, the ring gear 236, and the differential area 230 comprise another active lubricant circulating device. The returning lubricant is mixed with the lubricant in the differential area 230 and cooled. The lubricant in the differential area 230 may then be used to cool and lubricate the parts in the differential area 230, or flung into the first lubricant catch 266.

A person skilled in the relevant art will recognize that the subject matter disclosed herein may also be utilized with, but is not limited to use with, a locking differential.

While various embodiments have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
a differential carrier comprising a first portion and a second portion, wherein said first portion includes a first engagement surface, and said second portion includes a second engagement surface coupled with said first engagement surface;
said differential carrier first and second portions defining a differential area and a clutch area wherein said differential area and said clutch area are substantially separated by a partition;
said differential carrier first engagement surface including a lubricant channel fluidly connecting said differential area with said clutch area;
said lubricant channel at least partially disposed above said clutch area, and at least partially disposed in an outer wall of said differential carrier first portion;
a substantially cylindrical bearing retainer disposed through said outer wall of said differential carrier, wherein said bearing retainer extends into said clutch area; and
said bearing retainer having an aperture therethrough, whereby said lubricant channel is in fluid connection with said clutch area.

2. The axle assembly of claim 1, wherein
said lubricant channel divides into a first lubricant channel and a second lubricant channel,
wherein said second lubricant channel is at least partially disposed in a downward diagonal direction through said partition to said clutch area.

3. The axle assembly of claim 2, wherein:
said clutch area houses a clutch assembly, comprising:
a drum portion splined with a stub shaft,
a hub portion splined with an axle half shaft,
a first set of clutch plates coupled with said hub portion, and
a second set of clutch plates coupled with said drum portion;
wherein said drum portion defines at least one aperture therethrough; and
said second lubricant channel is in fluid communication with said drum portion at least one aperture.

4. The axle assembly of claim 1, wherein
said clutch area defines a lubricant sump,
said clutch area lubricant sump includes at least two radially extending protrusions disposed upwardly along an interior wall of said differential carrier, and
said differential carrier first engagement surface includes a return channel fluidly connecting said clutch area lubricant sump with said differential area.

5. The axle assembly of claim 4, wherein said differential area defines a lubricant sump, and said differential area lubricant sump defines an outlet of said return channel.

6. The axle assembly of claim 5, wherein said differential area houses a differential assembly, comprising:
a differential case,
a ring gear coupled with said differential case, wherein said ring gear receives driving force from a pinion gear,
a pair of pinion gears housed within said differential case,
a first side gear and a second side gear engaged with said pinion gears,
a stub shaft splined with said first side gear, and
a first axle half shaft splined with said second side gear.

7. The axle assembly of claim 6, wherein said clutch area houses a clutch assembly, comprising:
a drum portion splined with said stub shaft,
a hub portion splined with a second axle half shaft,
a first set of clutch plates coupled with said hub portion, and
a second set of clutch plates coupled with said drum portion.

8. The axle assembly of claim 7, further comprising:
a second lubricant circulating device comprising:
said clutch assembly drum portion, and
said clutch area lubricant sump, wherein said clutch area lubricant sump includes at least two radially extending protrusions.

9. The axle assembly of claim 7, wherein:
said clutch assembly drum portion defines at least one aperture therethrough, and
said lubricant channel is in fluid communication with said drum portion at least one aperture.

10. The axle assembly of claim 6, wherein:
said differential area lubricant sump includes a radially inward extending rib, said rib disposed adjacent to said return channel outlet.

11. The axle assembly of claim 10, further comprising:
a first lubricant circulating device comprising:
said ring gear at least partially disposed between said return channel outlet and said differential area lubricant sump rib.

12. An axle assembly, comprising:
a differential carrier comprising a first portion and a second portion, wherein said first portion includes a first engagement surface and said second portion includes a second engagement surface coupled with said first engagement surface;
a differential area and a clutch area defined by said differential carrier first and second portions, wherein said differential area and said clutch area are substantially separated by a partition; and
a lubricant channel at least partially defined by said first engagement surface, wherein said lubricant channel fluidly connects said differential area with said clutch area; and
a return channel at least partially defined by said first engagement surface, wherein said return channel fluidly connects said clutch area with said differential area.

13. The axle assembly of claim 12, further comprising:
a first radially extending protrusion disposed on an interior wall of said clutch area;
a second radially extending protrusion disposed on an interior wall of said clutch area between said first radially extending protrusion and said partition, wherein said first and second radially extending protrusions extend circumferentially about a portion of said interior wall;
a clutch drum disposed radially adjacent to said first and second radially extending protrusions; and
a return channel fluidly connecting said clutch area with said differential area, wherein a return channel lubricant catch is disposed adjacent to said first and second radially extending protrusions.

14. An axle assembly, comprising:
a differential carrier comprising a differential area and a clutch area, wherein said differential area and said clutch area are substantially separated by a partition;
a lubricant channel fluidly connecting said differential area with said clutch area;
a first lubricant sump disposed within said clutch area;
a second lubricant sump disposed within said differential area;

a return channel fluidly connecting said first lubricant sump with said second lubricant sump;
a radially inward extending rib disposed at least partially within said second lubricant sump adjacent to an outlet of said return channel; and
a ring gear at least partially disposed within said second lubricant sump between said rib and said return channel outlet.

* * * * *